United States Patent [19]
Yokoyama et al.

[11] Patent Number: 5,549,778
[45] Date of Patent: Aug. 27, 1996

[54] MANUFACTURING METHOD FOR MULTILAYER CERAMIC SUBSTRATE

[75] Inventors: Hiromitsu Yokoyama; Katsuto Takeuchi; Koji Soekawa; Kenichiro Abe; Syouichi Hattori; Hitoshi Suzuki; Nobuhide Okada, all of Kawasaki, Japan

[73] Assignee: Fujitsu Limited, Kawasaki, Japan

[21] Appl. No.: 519,178

[22] Filed: Aug. 25, 1995

Related U.S. Application Data

[63] Continuation of Ser. No. 291,709, Aug. 16, 1994, abandoned.

[30] Foreign Application Priority Data

Dec. 21, 1993 [JP] Japan .................................. 5-321760

[51] Int. Cl.$^6$ ............................................ B32B 31/00
[52] U.S. Cl. ..................... 156/246; 156/277; 427/96; 427/126.2; 427/369; 427/370; 427/372.2
[58] Field of Search .................................. 427/96, 126.2, 427/369, 370, 372.2; 156/246, 277

[56] References Cited

U.S. PATENT DOCUMENTS 4,645,552  2/1987  Vitriol et al. .......................... 156/89
4,943,470  7/1970  Shiromizu et al. ..................... 427/97
5,029,242  7/1991  Sammet .................................. 427/97
5,283,081  2/1994  Kata et al. ............................. 427/97
5,359,767  11/1994 Chen et al. ............................ 427/97

FOREIGN PATENT DOCUMENTS 58-122796  7/1983  Japan .
2-254791  10/1990  Japan .

Primary Examiner—Benjamin Utech
Attorney, Agent, or Firm—Armstrong, Westerman, Hattori, McLeland & Naughton

[57] ABSTRACT

A manufacturing method for a multilayer ceramic substrate superior in adhesion between the substrate and thick film pads formed on the surface of the substrate. Copper paste is screen-printed on a glass-ceramics green sheet for forming a surface layer to form a plurality of surface thick film pads respectively connected to a plurality of vias formed in the green sheet. Each of the surface thick film pads is partially covered with a dielectric material. Then, a plurality of green sheets for forming inner layers and the surface-layer green sheet are laminated together so that the surface-layer green sheet forms an uppermost layer. The laminated sheets are bonded integrally with each other by applying heat and pressure, and are then fired at a predetermined temperature for a predetermined time.

18 Claims, 7 Drawing Sheets

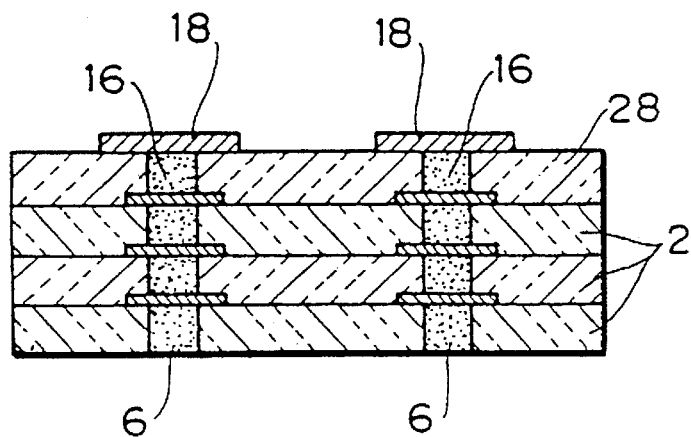
F I G. 6 (a)
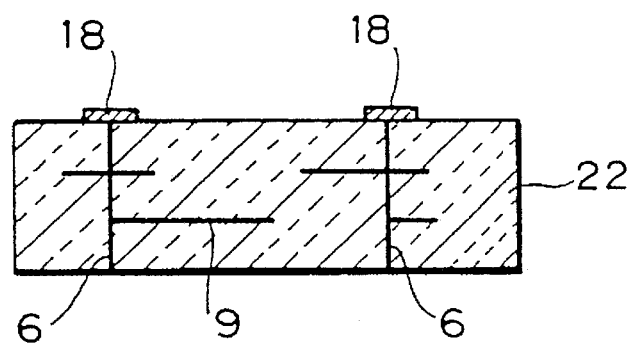
F I G. 6 (b)

MANUFACTURING METHOD FOR MULTILAYER CERAMIC SUBSTRATE

This application is a Continuation of application Ser. No. 08/291,709 filed Aug. 16, 1994, now abandoned.

BACKGROUND OF THE INVENTION

1. Field of the Invention

The present invention relates generally to a manufacturing method for a multilayer ceramic substrate, and more particularly to a forming method for a surface layer improved in adhesion strength of thick film pads.

2. Description of the Related Art

Electronic apparatus such as computers and electronic exchanges for processing a large amount of information are increasingly demanded to have a small size, high reliability, and high speed. Accordingly, high-density construction of electronic circuits is demanded. This demand is conventionally met by increasing a degree of integration of a chip (semiconductor element) itself. Further, in concert with a recent demand to high-density mounting and high-speed operation, there has been developed a multichip module having a plurality of chips mounted on a multilayer ceramic substrate which has a good heat dissipation property and is suitable for high-speed operation. Such a multichip module is now used in high-speed computers, electronic exchanges, etc.

Such a multilayer ceramic substrate is manufactured by the following conventional method, for example. First, a plurality of holes are formed through a green sheet of glass-ceramics, and these holes are filled with copper paste to form a plurality of vias. Then, copper paste is screen-printed on the green sheet to form a plurality of thick film pads connected to the vias and a plurality of thick film patterns connected to the thick film pads. Then, the green sheet is dried at a temperature of about 70° C. A plurality of green sheets each obtained in the above manner are laminated together and then bonded integrally with each other by applying heat and pressure. Then, the laminated green sheets thus bonded are fired to manufacture the multilayer ceramic substrate.

In many cases, surface conductor patterns are formed on a surface layer of the multilayer ceramic substrate by a thin film process, in consideration of adhesion between the conductor patterns and the substrate. However, the formation of the surface conductor patterns by the thin film process causes an increase in cost from the view-points of installation and steps. In contrast thereto, a thick film process for forming thick film pads by screen-printing a conductor paste on the surface layer have advantages of relatively inexpensive installation and simple steps, thus reducing a manufacturing cost. However, the thick film pads on the surface layer formed by the thick film process is insufficient in adhesion to the substrate. In particular, it is difficult to find a conductor paste superior in adhesion to a glass-ceramics substrate.

A conductor paste now commercially available has been developed for an alumina substrate, and a satisfactory adhesion characteristic on the alumina substrate is obtained. However, it is difficult to find a conductor paste which is superior in wettability to the glass-ceramics substrate and is enough satisfactory in adhesion to the substrate. In particular, a reduction in adhesion strength between the thick film pads on the surface layer and the glass-ceramics substrate causes a deterioration in connection strength between the thick film pads and the vias, thereby reducing reliability. This is considered to be due to the fact that the conductor paste does not match the glass-ceramics substrate.

SUMMARY OF THE INVENTION

It is therefore an object of the present invention to provide a manufacturing method for a multilayer ceramic substrate superior in adhesion between the substrate and thick film pads formed on the surface of the substrate.

In accordance with an aspect of the present invention, there is provided a manufacturing method for a multilayer ceramic substrate, comprising the steps of (a) forming a plurality of first holes through a first green sheet of glass-ceramics; (b) filling the first holes with a first conductor to form a plurality of first vias in the first green sheet; (c) printing a first conductor paste on the first green sheet to form a plurality of first thick film pads respectively connected to the first vias and a plurality of thick film patterns respectively connected to the first thick pads; (d) repeating the steps (a) to (c) to prepare a plurality of the first green sheets each formed with the first vias, the first thick film pads, and the thick film patterns; (e) forming a plurality of second holes through a second green sheet of glass-ceramics; (f) filling the second holes with a second conductor paste to form a plurality of second vias in the second green sheet; (g) printing a second conductor paste on the second green sheet to form a plurality of second thick film pads respectively connected to the second vias; (h) partially covering each of the second thick film pads with a dielectric material; (i) laminating the first green sheets prepared in step (d) and the second green sheet prepared in step (h) so that the second green sheet forms an uppermost layer; (j) applying heat and pressure to the first and second green sheets laminated together to bond the first and second green sheets integrally with each other; and (k) firing the first and second green sheets bonded together at a predetermined temperature for a predetermined time.

In this manner, each of the second thick film pads is partially covered with the dielectric material. Accordingly, the adhesion strength between the second thick film pads and the substrate can be increased. Alternatively, a plurality of reinforcement vias may be formed adjacent to each of the second vias, and each of the second thick pads may be formed so as to cover the reinforcement vias.

In another aspect of the present invention, a green sheet containing glass having a low softening point, such as lead borosilicate glass, is used as the glass-ceramics green sheet for forming the uppermost layer. Accordingly, the adhesion strength between the second thick film pads and the substrate can be improved.

As described above, the adhesion strength between the second thick film pads and the substrate can be increased by partially covering each of the second thick film pads formed on the surface layer with the dielectric material to thereby reinforce the second thick film pads, or by forming the plural reinforcement vias under each of the second thick film pads. With this arrangement, the reliability of connection between the second thick film pads and the second vias can be improved. In another aspect, the adhesion strength between the second thick film pads and the substrate can be increased by using the glass-ceramics green sheet containing the glass having a low softening point, which is superior in matching property to a conductor paste, as the surface layer only of the multilayer ceramic substrate.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 6(a) and 6(b) are sectional views illustrating a manufacturing method for a multilayer ceramic substrate according to a sixth preferred embodiment of the present invention.

DETAILED DESCRIPTION OF THE PREFERRED EMBODIMENTS

Some preferred embodiments of the present invention will be described in detail with reference to the drawings.

Figure 1:
FIGS. 1(a), 1(b), 1(c), 1(d), 1(e), and 1(f) are sectional views illustrating a manufacturing method for a multilayer ceramic substrate according to a first preferred embodiment of the present invention.
Figure 1:
Figure 1:
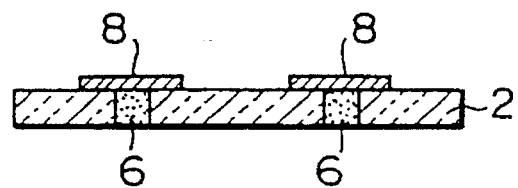
Figure 1:
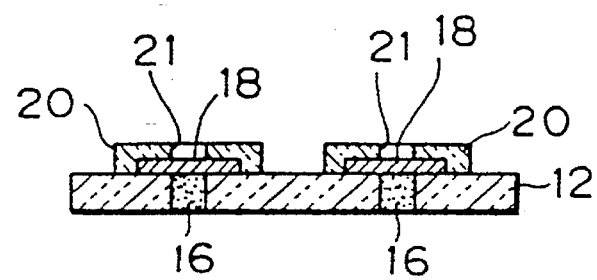
Figure 1:
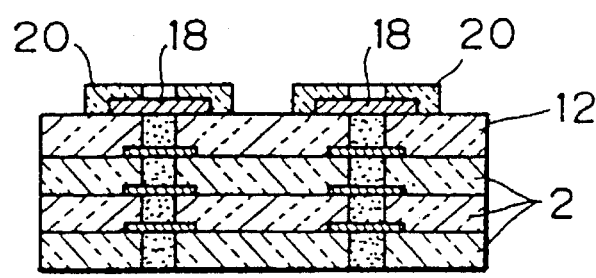
Figure 1:
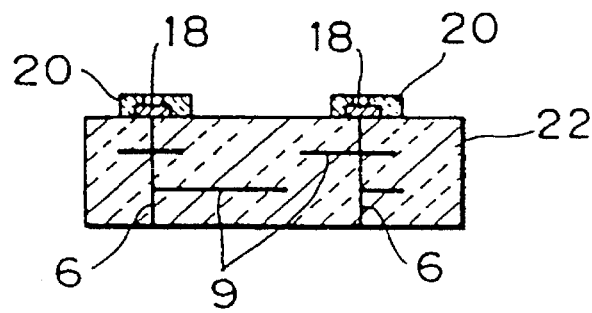

A manufacturing method for a multilayer ceramic substrate according to a first preferred embodiment of the present invention will now be described with reference to FIGS. 1(a) to 1(f). First, as shown in FIG. 1(a), a plurality of holes 4 each having a diameter of 90 μm for example are formed through a first glass-ceramics green sheet 2. The first green sheet 2 has a composition of 30 wt % of alumina having a particle size of 4 to 5 μm, 30 wt % of silica glass having a particle size of 5 to 6 μm, 30 wt % of borosilicate glass having a particle size of 5 to 6 μm, 8 wt % of acrylic resin, and 2 wt % of dibutyl phthalate.

Then, as shown in FIG. 1(b), the holes 4 are filled with copper powder or copper paste to form a plurality of first vias 6. Then, as shown in FIG. 1(c), copper paste is screen-printed on the first green sheet 2 to form a plurality of inner-layer thick film pads 8 respectively connected to the first vias 6 and a plurality of inner-layer thick film patterns (not shown) respectively connected to the inner-layer thick film pads 8. Thereafter, the first green sheet 2 is dried at a temperature of about 70° C. In the same way, a total nine layers of the first green sheets 2 each shown in FIG. 1(c) are prepared.

Then, as shown in FIG. 1(d), a plurality of holes each having a diameter of 90 μm for example are formed through a second glass-ceramics green sheet 12 having the same composition as that of the first green sheet 2, and these holes are filled with copper powder or copper paste to form a plurality of second vias 16. Then, commercially available copper paste Du Pont QP153 (manufactured by E. I. Du Pont de Nemours & Co., Inc.) is screen-printed on the second green sheet 12 to form a plurality of surface thick film pads 18 respectively connected to the second vias 16. Each of the surface thick film pads 18 has a planar size of 1.0×1.0 mm.

After drying the whole, dielectric paste having the same primary components as those of the first and second green sheets 2 and 12 is screen-printed on the second green sheet 12 to form a plurality of dielectric layers 20 partially covering the surface thick film pads 18, respectively. Each of the dielectric layers 20 has a hole 21 for allowing connection of the surface thick film pads 18. Each dielectric layer 20 has a composition of 25 wt % of alumina having a particle size of 4 to 5 μm, 25 wt % of silica glass having a particle size of 5 to 6 μm, 25 wt % of borosilicate glass having a particle size of 5 to 6 μm, 4 wt % of acrylic resin, 20 wt % of terpineol, and 1 wt % of hardened castor oil.

Then, as shown in FIG. 1(e), the plurality of first green sheets 2 and the second green sheet 12 are laminated together so that the second green sheet 12 forms an uppermost layer, and the laminated sheets 2 and 12 are integrally bonded together by using a hot press. The hot pressing of the laminated sheets 2 and 12 is performed at a temperature ranging from 100° C. to 150° C. under a pressure ranging from 250 kg/cm$^2$ to 350 kg/cm$^2$, preferably at a temperature of 130° C. under a pressure of 300 kg/cm$^2$.

The first and second green sheets 2 and 12 thus integrally bonded are fired in the atmosphere of nitrogen at a temperature of 1000° C. for a period of about 4 hours to manufacture a multilayer ceramic substrate 22 shown in FIG. 1(f). The firing conditions that can be adopted in the present invention are a temperature ranging from about 980° C. to about 1020° C. and a time period ranging from about 3 hours to about 5 hours. In FIG. 1(f), reference numerals 9 denote the inner-layer thick film patterns. Each of the surface thick film pads 18 manufactured by the above method is partially covered with the corresponding dielectric layer 20. Accordingly, the adhesion strength between the surface thick film pads 18 and the multilayer ceramic substrate 22 can be increased to thereby improve the reliability of connection between the surface thick film pads 18 and the second vias 16.

A manufacturing method for a multilayer ceramic substrate according to a second preferred embodiment of the present invention will now be described with reference to FIGS. 2(a) and 2(b). In this preferred embodiment, a manufacturing method for first green sheets 2 for forming inner layers is similar to that shown in FIGS. 1(a) to 1(c), so that the description thereof will be omitted. Further, a manner of formation of surface thick film pads 18 on a second green sheet 12 is also similar to that in the first preferred embodiment, so that the description thereof will be omitted. The second preferred embodiment is featured by the step of laminating on the second green sheet 12 a third green sheet 24 having a plurality of holes 25 respectively exposed to the surface thick film pads 18. The third green sheet 24 has substantially the same composition as that of the first and second green sheets 2 and 12.

Figure 2A:
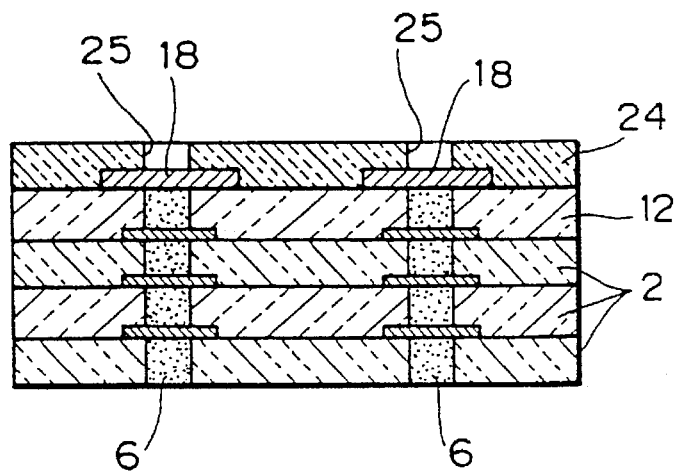
FIGS. 2(a) and 2(b) are sectional views illustrating a manufacturing method for a multilayer ceramic substrate according to a second preferred embodiment of the present invention.
Figure 2B:
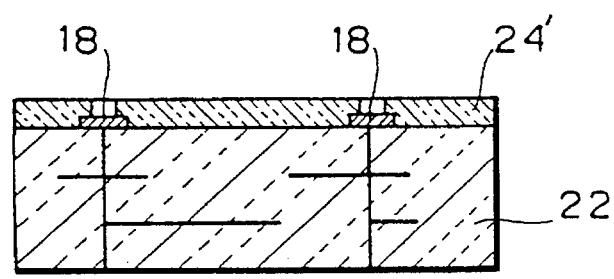

As shown in FIG. 2(a), the first, second, and third green sheets 2, 12, and 24 are laminated together so that the third green sheet 24 forms an uppermost layer, and the laminated sheets 2, 12, and 24 are integrally bonded together by using a hot press. Then, the laminated sheets 2, 12, and 24 thus integrally bonded are fired in the atmosphere of nitrogen at a temperature of 1000° C. for a period of about 4 hours to manufacture a multilayer ceramic substrate 22 shown in FIG. 2(b). Each of the surface thick film pads 18 is partially covered with a glass-ceramic layer 24' formed from the third green sheet 24. Accordingly, the adhesion strength between the surface thick film pads 18 and the multilayer ceramic substrate 22 can be increased.

Figure 3A:
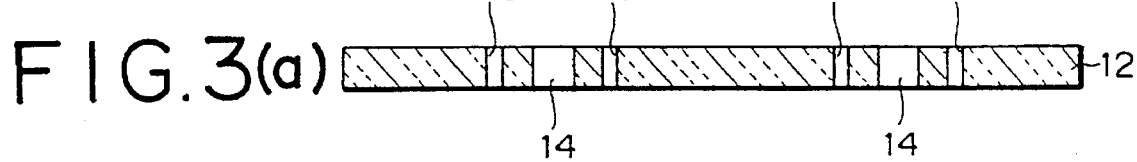
FIGS. 3(a), 3(b), 3(c), and 3(d) are sectional views illustrating a manufacturing method for a multilayer ceramic substrate according to a third preferred embodiment of the present invention.

A manufacturing method for a multilayer ceramic substrate according to a third preferred embodiment of the present invention will now be described with reference to FIGS. 3(a) to 3(d). In this preferred embodiment, a manufacturing method for first green sheets 2 for forming inner layers is similar to that in the first preferred embodiment, so that the description thereof will be omitted. As shown in FIG. 3(a), a plurality of via holes 14 are formed through a second glass-ceramics green sheet 12 for forming a surface layer, and a plurality of, e.g., eight, reinforcement holes 15 are formed around each of the via holes 14 so as to pass through the thickness of the second green sheet 12.

Figure 3B:
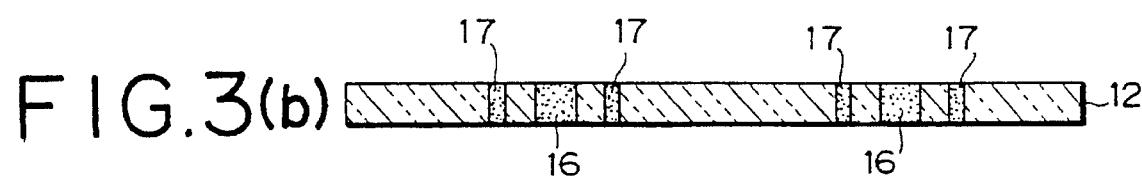
Figure 3C:
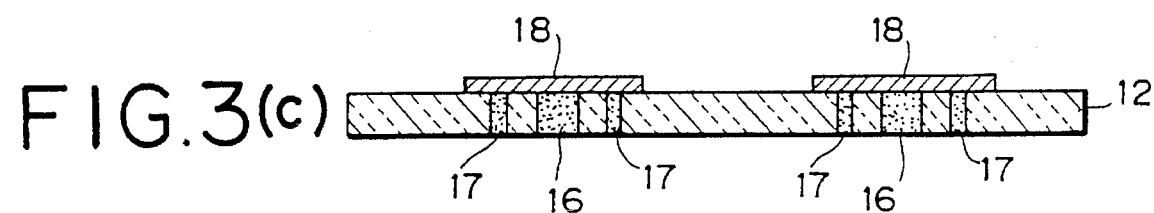

Then, the via holes 14 and the reinforcement holes 15 are filled with copper paste to form a plurality of second vias 16 and a plurality of reinforcement vias 17 as shown in FIG. 3(b). Then, commercially available copper paste Du Pont QP153 identical with that used in the first preferred embodiment is screen-printed on the second green sheet 12 to form a plurality of surface thick film pads 18 respectively connected to the second vias 16 and the reinforcement vias 17 as shown in FIG. 3(c).

Figure 3D:
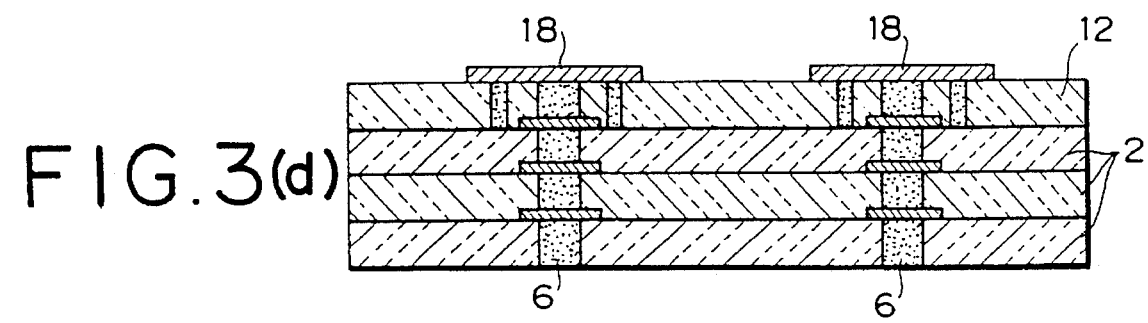

Then, as shown in FIG. 3(d), the first and second green sheets 2 and 12 are laminated together so that the second green sheet 12 forms an uppermost layer, and the laminated sheets 2 and 12 are integrally bonded together by using a hot press at a temperature of 130° C. under a pressure of 300 kg/cm². Then, the laminated sheets 2 and 12 thus integrally bonded are fired in the atmosphere of nitrogen at a temperature of 1000° C. for a period of about 4 hours to manufacture a multilayer ceramic substrate. In this multilayer ceramic substrate, each of the surface thick film pads 18 is connected to the plurality of reinforcement vias 17. Accordingly, the adhesion strength between the surface thick film pads 18 and the multilayer ceramic substrate can be remarkably improved by an anchoring effect of the reinforcement vias 17.

Figure 4:
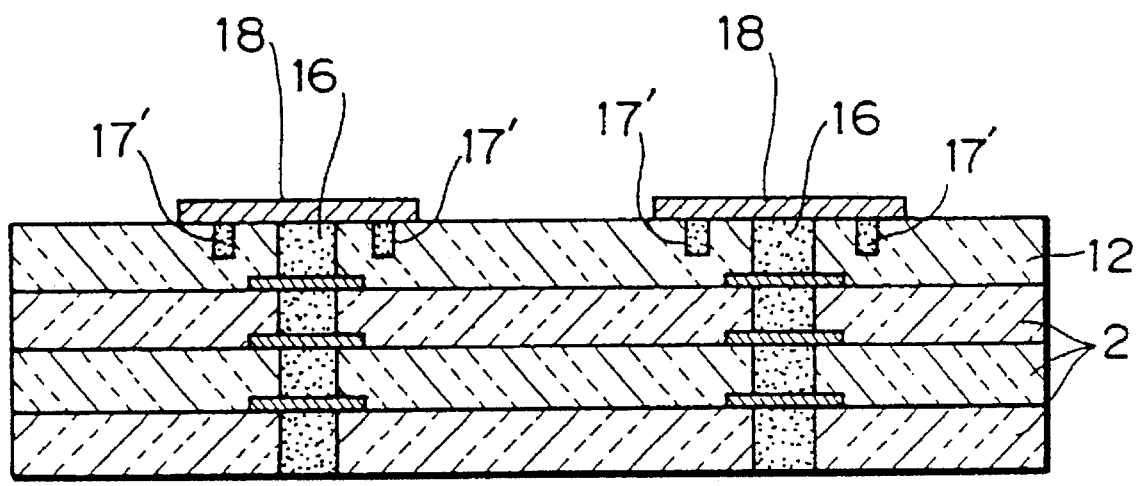
FIG. 4 is a sectional view illustrating a manufacturing method for a multilayer ceramic substrate according to a fourth preferred embodiment of the present invention.

FIG. 4 shows a fourth preferred embodiment of the present invention, which is a modification of the third preferred embodiment. The fourth preferred embodiment is different from the third preferred embodiment in only the point that reinforcement holes for forming reinforcement vias 17' are formed as blind holes. Also in the fourth preferred embodiment, an effect similar to that in the third preferred embodiment can be obtained by an anchoring effect of the reinforcement vias 17'.

Figure 5:
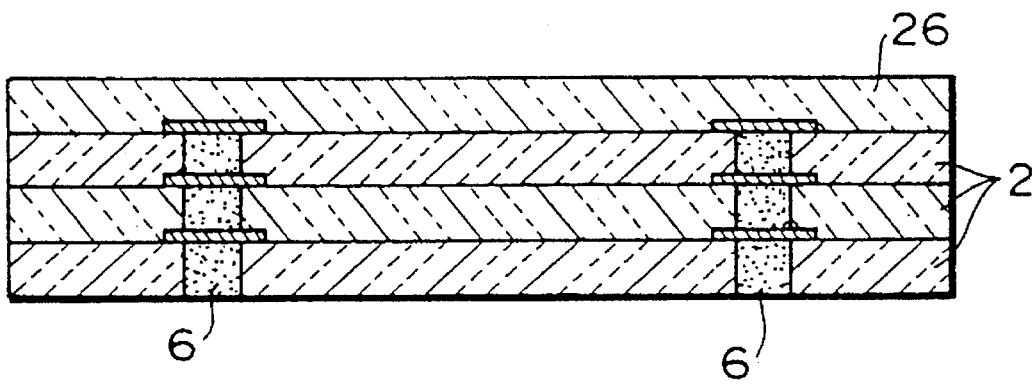
FIGS. 5(a), 5(b), and 5(c) are sectional views illustrating a manufacturing method for a multilayer ceramic substrate according to a fifth preferred embodiment of the present invention.
Figure 5:
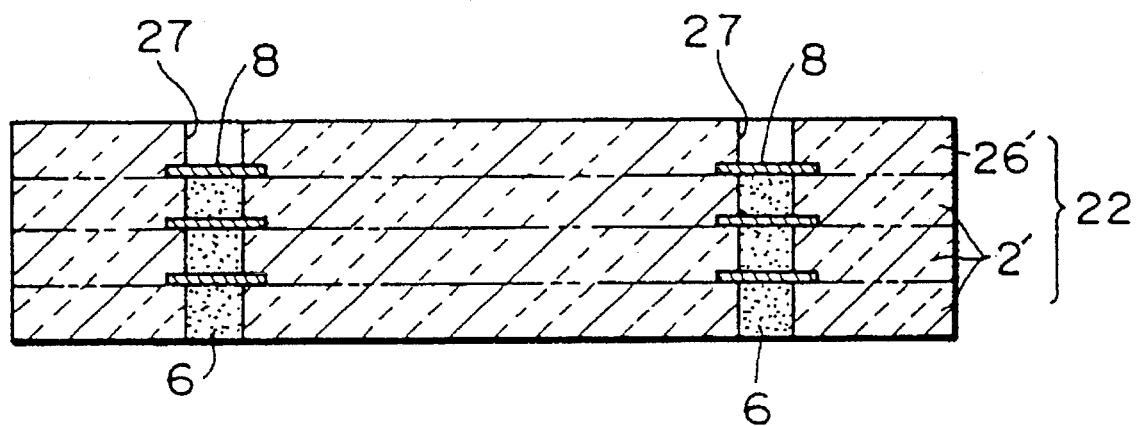
Figure 5:
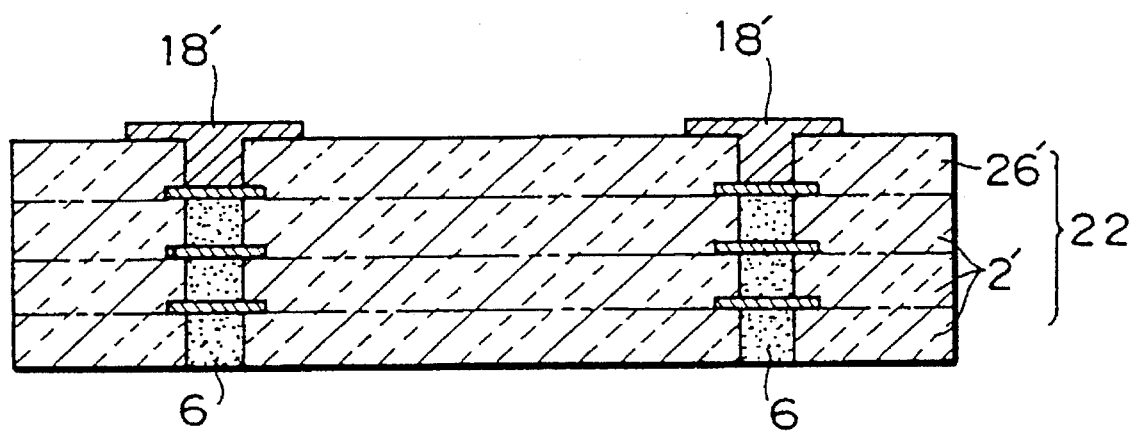

A manufacturing method for a multilayer ceramic substrate according to a fifth preferred embodiment of the present invention will now be described with reference to FIGS. 5(a) to 5(c). In this preferred embodiment, a manufacturing method for first green sheets 2 for forming inner layers is similar to that in the first preferred embodiment, so that the description thereof will be omitted. As shown in FIG. 5(a), a second or dummy green sheet 26 for forming a surface layer is laminated on the laminate of the first green sheets 2, and the laminated sheets 2 and 26 are integrally bonded together by using a hot press at a temperature of 130° C. under a pressure of 300 kg/cm². Then, the laminated sheets 2 and 26 are fired in the atmosphere of nitrogen at a temperature of 1000° C. for a period of about 4 hours.

Then, photoresist is applied to a surface ceramic layer 26' formed from the second green sheet 26, and the photoresist is exposed to light and developed in a given pattern by a photolithography process. Then, the surface ceramic layer 26' is etched by hydrofluoric acid to form a plurality of holes 27 through the surface ceramic layer 26' as shown in FIG. 5(b). This etching can remove oxide films on the inner-layer thick film pads 8 or on the inner-layer vias 6 exposed to the holes 27. Then, post-firing copper paste Du Pont QS190 (manufactured by E. I. Du Pont de Nemours & Co., Inc.) is screen-printed on the surface ceramic layer 26' to form a plurality of surface thick film pads 18' which are partially embedded in the holes 27.

Thereafter, firing at a temperature of 600° C. for a period of about 20 minutes is performed to manufacture a multilayer ceramic substrate 22 as shown in FIG. 5(c). The firing conditions that can be adopted in this stage are a temperature ranging from about 500° C. to about 700° C. and a time period ranging from about 10 minutes to about 30 minutes. In this preferred embodiment, the surface thick film pads 18' are embedded in the holes 27 formed through the surface ceramic layer 26'. Accordingly, the reliability of connection between the thick film pads 18' and the vias 6 is improved.

A manufacturing method for a multilayer ceramic substrate according to a sixth preferred embodiment of the present invention will now be described with reference to FIGS. 6(a) and 6(b). Also in this preferred embodiment, a manufacturing method for first green sheets 2 for forming inner layers is similar to that in the first preferred embodiment, so that the description thereof will be omitted. The sixth preferred embodiment is featured by the use of a glass-ceramics green sheet 28 containing lead borosilicate glass having a low softening point as the second glass-ceramics green sheet for forming a surface layer. Lead borosilicate glass has a softening point of 513° C., whereas borosilicate glass has a softening point of 720° C.

The second green sheet 28 has a composition of 30 wt % of alumina having a particle size of 4 to 5 μm, 30 wt % of silica glass having a particle size of 5 to 6 μm, 30 wt % of lead borosilicate glass having a particle size of 5 to 6 μm, 8 wt % of acrylic resin, and 2 wt % of dibutyl phthalate. A plurality of holes are formed through the second green sheet 28, and they are filled with copper paste to form a plurality of second vias 16. Then, commercially available copper paste Du Pont QP153 identical with that used in the first preferred embodiment is screen-printed on the second green sheet 28 to form a plurality of surface thick film pads 18 respectively connected to the second vias 16.

Then, the plurality of first green sheets 2 and the second green sheet 28 are laminated together as shown in FIG. 6(a), and they are integrally bonded together by using a hot press at a temperature of 130° C. under a pressure of 300 kg/cm². Then, the laminated sheets 2 and 28 thus integrally bonded are fired in the atmosphere of nitrogen at a temperature of 1000° C. for a period of about 4 hours to form a multilayer ceramic substrate 22 as shown in FIG. 6(b).

In this preferred embodiment, the second green sheet 28 for forming a surface layer contains glass having a low softening point. Accordingly, the adhesion strength between the surface thick film pads 18 and the multilayer ceramic substrate 22 can be improved. Further, the first green sheets 2 for forming inner layers contain glass having a high softening point. Accordingly, the inner layers are superior in electrical characteristics, mechanical characteristics, and easiness of firing.

Figure 7:
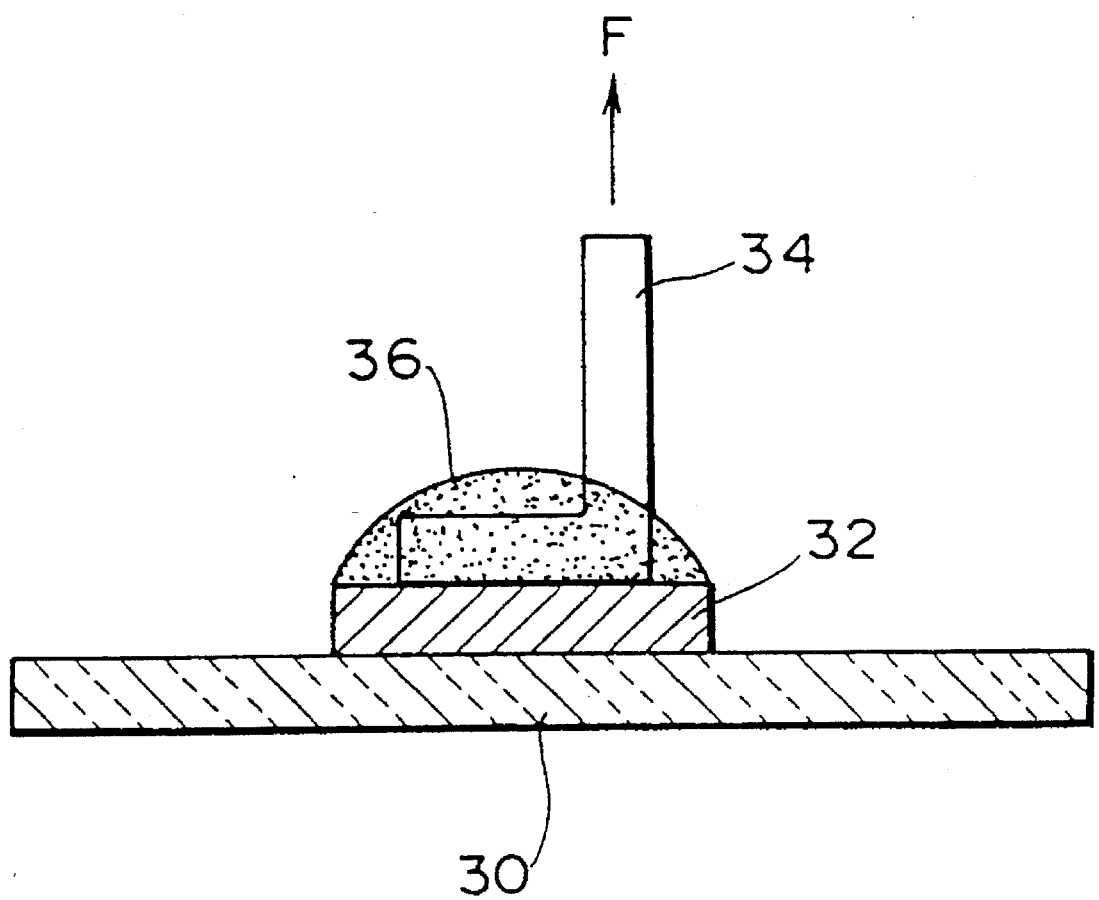
FIG. 7 is a sectional view illustrating a method of measuring an adhesion strength.

A test method for the adhesion strength of the surface thick film pad to the substrate will now be described with reference to FIG. 7. The test method adopted is a 90° peeling test method. A thick film pad 32 having a planar size of 1.4×1.4 mm and a thickness of 30 to 40 μm was formed on a glass-ceramic substrate 30 by using the methods according to the first to sixth preferred embodiments. Then, a tin-plated soft copper wire 34 having a diameter of 0.8 mm was soldered at 36 to the thick film pad 32. Thereafter, the soft copper wire 34 was pulled in a direction shown by an arrow F. The results of measured values of the adhesion strength are shown in Table 1. Also shown in Table 1 is the result as a comparison obtained by using a thick film pad formed on a glass-ceramic substrate according to the conventional method.

TABLE 1

|  | Preferred Embodiments | | | | | | Comparison. |
|---|---|---|---|---|---|---|---|
|  | First | Second | Third | Fourth | Fifth | Sixth |  |
| Adhesion Strength (kg/mm²) | 1.30 | 1.75 | 1.35 | 1.25 | 1.25 | 1.20 | 0.70 |

As apparent from Table 1, the adhesion strength of the surface thick film pad to the substrate according to each preferred embodiment of the present invention is superior to that according to the conventional method.

According to the present invention, a multilayer ceramic substrate having surface thick film pads greatly improved in adhesion strength to a substrate surface can be manufactured at a low cost. Accordingly, the reliability of connection between the surface thick film pads and the vias can be greatly improved.

What is claimed is:

1. A manufacturing method for a multilayer ceramic substrate, comprising the steps of:
   (a) forming a plurality of first holes through a first green sheet comprising glass and ceramics;
   (b) filling said first holes with a first conductor to form a plurality of first vias in said first green sheet;
   (c) printing a first conductor paste on said first green sheet to form a plurality of first thick pads connected to said first vias and a plurality of thick film patterns connected to said first thick pads;
   (d) repeating said steps (a) to (c) to prepare a plurality of said first green sheets each formed with said first vias, said first thick film pads, and said thick film patterns;
   (e) forming a plurality of second holes through a second green sheet comprising glass and ceramics;
   (f) filling said second holes with a second conductor paste to form a plurality of second vias in said second green sheet;
   (g) printing a second conductor paste on said second green sheet to form a plurality of second thick film pads connected to said second vias;
   (h) partially covering each of said second thick film pads with a dielectric material;
   (i) laminating said first green sheets prepared in step (d) and said second green sheet prepared in step (h) so that said second green sheet forms an uppermost layer;
   (j) applying heat and pressure to said first and second green sheets laminated together to bond said first and second green sheets integrally with each other; and
   (k) firing said first and second green sheets bonded together.

2. A manufacturing method for a multilayer ceramic substrate according to claim 1, wherein each of said first green sheets has the same composition as that of said second green sheet, and said dielectric material is in the form of paste containing the same components as those of said first and second green sheets.

3. A manufacturing method for a multilayer ceramic substrate according to claim 2, wherein each of said first and second green sheets is composed of 30 wt % of alumina, 30 wt % of silica glass, 30 wt % of borosilicate glass, 8 wt % of acrylic resin, and 2 wt % of dibutyl phthalate, and said dielectric material in the form of paste is composed of 25 wt % of alumina, 25 wt % of silica glass, 25 wt % of borosilicate glass, 4 wt % of acrylic resin, 20 wt % of terpineol, and 1 wt % of hardened castor oil.

4. A manufacturing method for a multilayer ceramic substrate according to claim 1, wherein said dielectric material comprises a third green sheet having the same composition as that of said second green sheet.

5. A manufacturing method for a multilayer ceramic substrate according to claim 4, further comprising the step of forming a plurality of third holes smaller in planar size than said second thick film pads through said third green sheet at a portion thereof covering said second thick film pads.

6. A manufacturing method for a multilayer ceramic substrate according to claim 1, wherein said firing is conducted at a temperature ranging from about 980° C. to about 1020° C., for a time ranging from about 3 hours to about 5 hours.

7. A manufacturing method for a multilayer ceramic substrate, comprising the steps of:
   (a) forming a plurality of first holes through a first green sheet comprising glass and ceramics;
   (b) filling said first holes with a first conductor to form a plurality of first vias in said first green sheet;
   (c) printing a first conductor paste on said first green sheet to form a plurality of first thick film pads connected to said first vias and a plurality of thick film patterns connected to said first thick pads;
   (d) repeating said steps (a) to (c) to prepare a plurality of said first green sheets each formed with said first vias, said first thick film pads, and said thick film patterns;
   (e) forming a plurality of second holes through a second green sheet comprising glass and ceramics;
   (f) forming a plurality of third holes adjacent to each of said second holes;
   (g) filling said second and third holes with a second conductor paste to form a plurality of second vias and a plurality of reinforcement vias in said second green sheet;
   (h) printing a second conductor paste on said second green sheet to form a plurality of second thick film pads connected to said second vias and said reinforcement vias;
   (i) laminating said first green sheets prepared in step (d) and said second green sheet prepared in step (h) so that said second green sheet forms an uppermost layer;
   (j) applying heat and pressure to said first second green sheets laminated together to bond said first and second green sheets integrally with each other; and
   (k) firing said first and second green sheets bonded together.

8. A manufacturing method for a multilayer ceramic substrate according to claim 7, wherein said reinforcement vias extend through said second green sheet.

9. A manufacturing method for a multilayer ceramic substrate according to claim 7, wherein said reinforcement vias extend from a top surface of said second green sheet and terminate in between the top surface and a bottom surface of said second green sheet.

10. A manufacturing method for a multilayer ceramic substrate according to claim 7, wherein each of said first and second green sheets is composed of 30 wt % of alumina, 30 wt % of silica glass, 30 wt % of borosilicate glass, 8 wt % of acrylic resin, and 2 wt % of dibutyl phthalate.

11. A manufacturing method for a multilayer ceramic substrate according to claim 7, wherein said firing is conducted at a temperature ranging from about 980° C. to about 1020° C., for a time ranging from about 3 hours to about 5 hours.

12. A manufacturing method for a multilayer ceramic substrate, comprising the steps of:
  (a) forming a plurality of first holes through a first green sheet comprising glass and ceramics;
  (b) filling said first holes with a first conductor to form a plurality of first vias in said first green sheet;
  (c) printing a first conductor paste on said first green sheet to form a plurality of first thick film pads connected to said first vias and a plurality of thick film patterns connected to said first thick pads;
  (d) repeating said steps (a) to (c) to prepare a plurality of said first green sheets each formed with said first vias, said first thick film pads, and said thick film patterns;
  (e) preparing a second green sheet comprising glass and ceramics having the same composition as that of said first green sheet;
  (f) laminating said first green sheets prepared in step (d) and said second green sheet prepared in step (e) so that said second green sheet forms an uppermost layer;
  (g) applying heat and pressure to said first and second green sheets laminated together to bond said first and second green sheets integrally with each other;
  (h) firing said first and second green sheets bonded together at a first temperature for a first period of time;
  (i) etching a surface layer formed from said second green sheet in said step (h) to form a plurality of second holes to which said first vias are exposed;
  (j) printing a second conductor paste on said surface layer to form a plurality of second thick film pads partially embedded in said second holes; and
  (k) firing said second thick film pads at a second temperature for a second period of time.

13. A manufacturing method for a multilayer ceramic substrate according to claim 12, wherein said first temperature ranges from about 980° C. to about 1020° C., and said first period of time ranges from about 3 hours to about 5 hours.

14. A manufacturing method for a multilayer ceramic substrate according to claim 12, wherein said second temperature ranges from about 500° C. to about 700° C., and said second period of time ranges from about 10 minutes to about 30 minutes.

15. A manufacturing method for a multilayer ceramic substrate, comprising the steps of:
  (a) forming a plurality of first holes through a first green sheet comprising glass and ceramics, wherein the glass has a first softening point;
  (b) filling said first holes with a first conductor to form a plurality of first vias in said first green sheet;
  (c) printing a first conductor paste on said first green sheet to form a plurality of first thick film pads connected to said first vias and a plurality of thick film patterns respectively connected to first thick pads;
  (d) repeating said steps (a) to (c) to prepare a plurality of said first green sheets each formed with said first vias, said first thick film pads, and said thick film patterns;
  (e) forming a plurality of second holes through a second green sheet comprising glass and ceramics wherein the glass has a second softening point which is lower than said first softening point;
  (f) filling said second holes with a second conductor paste to form a plurality of second vias in said second green sheet;
  (g) printing a second conductor paste on said second green sheet to form a plurality of second thick film pads connected to said second vias;
  (h) laminating said first green sheets prepared in step (d) and said second green sheet prepared in step (g) so that said second green sheet forms an uppermost layer;
  (i) applying heat and pressure to said first and second green sheets laminated together to bond said first and second green sheets integrally with each other; and
  (j) firing said first and second green sheets bonded together.

16. A manufacturing method for a multilayer ceramic substrate according to claim 15, wherein said firing is conducted at a temperature ranging from about 980° C. to about 1020° C., for a period of time ranging from about 3 hours to about 5 hours.

17. A manufacturing method for a multilayer ceramic substrate according to claim 15, wherein each of said first sheets is composed of 30 wt % of alumina, 30 wt % of silica glass, 30 wt % of borosilicate glass, 8 wt % of acrylic resin, and 2 wt % of dibutyl phthalate, and said second green sheet is composed of 30 wt % of alumina, 30 wt % of silica glass, 30 wt % of lead borosilicate glass, 8 wt % of acrylic resin, and 2 wt % of dibutyl phthalate.

18. A manufacturing method for a multilayer ceramic substrate according to any one of claims 1, 7, 12 and 15, wherein said multilayer ceramic has an adhesion strength of at least 1.20 kg/mm$^2$.

* * * * *